United States Patent Office 3,157,364
Patented Nov. 17, 1964

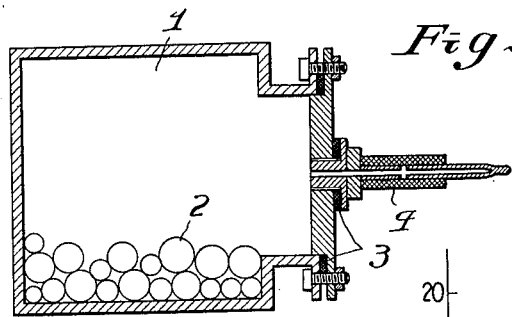
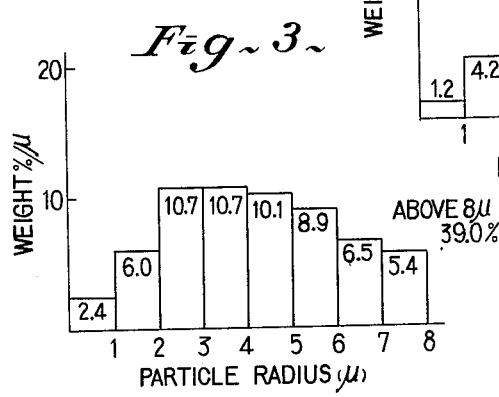
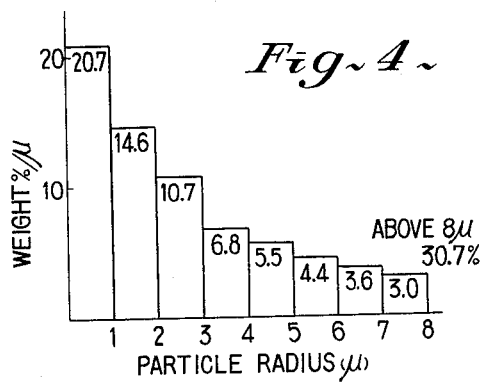

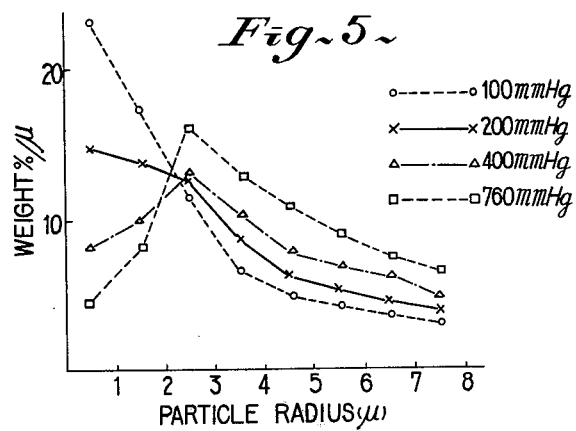
Fig-5-
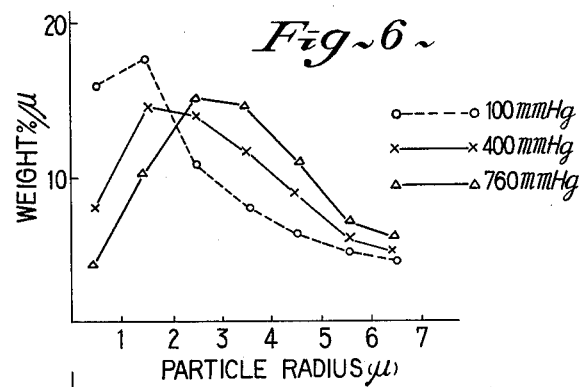
Fig-6-
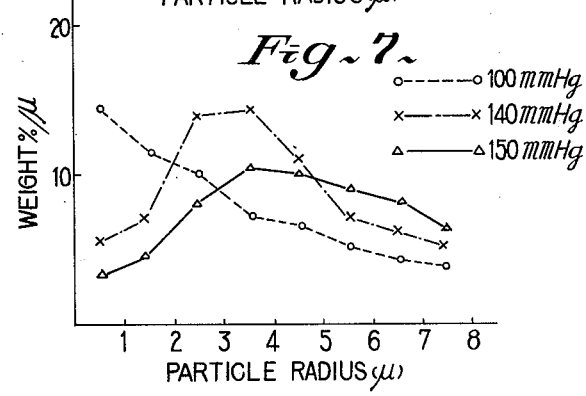
Fig-7-

3,157,364
METHOD OF PULVERIZING GRAPHITE
Akinori Muta and Yasuhiko Uehara, Tokyo-to, Japan, assignors to Kabushiki Kaisha Hitachi Seisakusho, Tokyo-to, Japan, a company of Japan
Filed Oct. 9, 1961, Ser. No. 143,746
7 Claims. (Cl. 241—16)

This invention relates to techniques in the pulverizing of graphite, and more particularly it relates to a new method of pulverizing graphite wherein graphite in the form of particles or powder is pulverized by means of an impact type pulverization in an atmosphere of dry gases, under reduced pressure, or in a vacuum.

In spite of the fact that graphite is used industrially for a wide range of uses, for example, for the production of reactor materials, solid lubricants, crucibles, pencil cores, and electric resistors, the methods of pulverizing graphite known heretofore have not been entirely satisfactory.

Hitherto, graphite ore has been pulverized in the case of the dry method, by such means as hammer mills, crushers, and rolls for the usual (coarse) pulverizing, and in the case of wet method, by such means as ball mills for the fine pulverizing. The pulverizing efficiencies of these pulverizing means have been extremely low, and particularly fine pulverizing has heretofore been very difficult. For example, the yield of fine-sized powder of 1 micron size or smaller has been extremely low, approximately 0.6 percent, even after several tens of hours of pulverizing.

It is an object of the present invention to provide a new method of pulverizing graphite whereby fine-size graphite powder can be produced at a high yield rate in a considerably shorter time than in the case of conventional methods.

The foregoing object, other objects, and advantages have been achieved by the method of the present invention, which, briefly stated in general terms, comprises pulverizing graphite in the form of particles or powder by means of an impact type pulverizer in an atmosphere of dry gases, under reduced pressure, or in a vacuum.

The nature of the present invention will be better understood from the following consideration. As is apparent from the fact that, in general, graphite itself is used as a solid lubricant, it has a hexagonal crystalline structure having laminar cleavage characteristic. Furthermore, the adsorbed film of a minute quantity of water and various gases adsorbed on the graphite acts as a lubricating oil, and the graphite exhibits substantial lubricating property. Consequently, the fine pulverizing of graphite is difficult. For this reason, if graphite is pulverized in a vacuum wherein a minute quantity of water and various gases do not exist, under reduced pressure whereby such influences are reduced, or in an atmosphere of non-lubricant gas such as nitrogen gas or inert gases, the aforesaid adsorbed film will become less than monomolecular in thickness, and the graphite will be pulverized in a state of high friction. Accordingly, it will be possible to produce fine particles with ease.

The nature and details of the present invention as well as the significance of its unique features will be more clearly apparent by reference to the following description of comparative tests taken in conjunction with the accompanying illustrations in which:

FIG. 1 is a schematic, side elevational view, in section in a plane passing through the centerline, showing an airtight ball mill used in the comparative tests for the present invention;

FIG. 2 is a graphical chart representing the distribution of particle size of raw graphite powder; and FIGS. 3, 4, 5, 6, and 7 are graphical representations of particle size distributions of graphite powders which have been produced by pulverizing for 15 hours, each separately, in the ball mill shown in FIG. 1 under different environmental conditions as follows: FIG. 3, in air at atmospheric pressure; FIG. 4, in a vacuum, in dry nitrogen gas, and dry inert gases; FIG. 5 in dry hydrogen gas; FIG. 6 in dry carbon dioxide; and FIG. 7, in dry oxygen gas.

Referring to FIG. 1, the airtight ball mill used for obtaining comparative data had, as its principal structural part, a steel pot 1 of 20-cm. length and 18-cm. diameter, which was provided with a length of rubber tubing 4 and glass tube 5 connected to the said pot 1 by a suitable fitting so as to be communicative with the interior of the pot as shown. Rubber packings 3 for sealing joints were provided for gastightness of the pot interior with respect to the outside atmosphere. Fifty-five steel balls 2, five of 25-mm. diameter and fifty of 20-mm. diameter, were placed in the pot 1. For each test, the ball mill was operated at a rotational speed of 110 r.p.m., and 100 grams of raw graphite powder which had been heated and dried at 300° C. for 3 hours was placed in the ball mill as the starting material.

In the case of pulverizing in a vacuum, the ball mill, in which the raw graphite powder had been placed, was evacuated by means of a vacuum pump, then the glass tube 5 was sealed, and the pulverizing operation was carried out. In the case of pulverizing in various dry gases or in various dry gases under reduced pressure, the ball mill, in which the raw graphite powder had been placed, was first evacuated in each case by means of a vacuum pump; then the dried gas, which had been dried by passing it through phosphorus pentoxide and a Dry-Ice-acetone drying condenser, was permitted into the ball mill until the desired pressure was reached. The glass tube 5 was then sealed, and the pulverizing operation was carried out. Fifty-five balls were placed in the mill, fifty of one size and five of another.

The particle size distribution, as measured by the sedimentation method, of the raw graphite powder used in the tests is shown in FIG. 2. The particle size distribution of graphite powder produced by pulverizing for 15 hours in air at atmospheric pressure in the aforesaid ball mill, that is, by the conventional dry method, is shown in FIG. 3. The increase in large particles as indicated in FIG. 3 as compared with the raw graphite is due to the coagulation occurring mutually between the particles. As is apparent from this result, fine pulverizing of graphite by the dry method is almost impossible.

FIG. 4 indicates the particle size distribution in the three cases wherein graphite was pulverized for 15 hours in a vacuum, in dry nitrogen gas, and in dry inert gases in the aforesaid ball mill. The results for these three cases are almost identical. As is apparent by comparison with the result of conventional pulverizing in air at atmospheric pressure as indicated in FIG. 3, the method of pulverizing graphite according to the present invention results in a remarkably high pulverizing efficiency. As a further test, pulverizing in dry nitrogen gas and dry inert gases under various pressures up to 5 kg./cm.$^2$ was carried out by means of the aforesaid ball mill. It was found that the degree of pulverizing thus obtained is unrelated to the gas pressure and is the same as that of pulverizing in a vacuum.

FIGS. 5, 6, and 7 indicate the particle size distributions of graphite particles obtained by pulverizing in dry hydrogen gas, in dry carbon dioxide gas, and in dry oxygen gas, respectively. In the cases of pulverizing in dry carbon dioxide gas and in dry hydrogen gas, pulverizing progressed substantially even at 760 mm. Hg pressure, and the pulverizing efficiency increased with decrease of pressure. In the case of pulverizing in dry oxygen gas, the degree of pulverizing at 150 mm. Hg or higher pressure was the same as that in the case of pulverizing in air at atmospheric pressure, favorable effect being exhibited slightly at 140 mm. Hg and decreasing as the pressure was increased. It was found also that in the cases of pulverizing in vacuum, in nitrogen gas, and in inert gases, the degree of pulverizing was exactly the same as that in the case of pulverizing in air at atmospheric pressure if the water vapor pressure within the ball mill was 5 mm. Hg or higher. It was found further that gases of various organic substances had the same effect as water vapor.

Another significant result of the practice of the method of pulverizing according to the present invention is that fine-sized graphite powder produced thereby is remarkably different in nature from that produced by conventional methods, being jet black as carbon black and being extremely active. Examination of the shape of the graphite particles of this powder by means of an electron microscope reveals that the shape is nearly spherical, which is in marked contrast to the flake form of graphite particles produced by conventional pulverizing methods. Furthermore, as a result of such measurements by X-ray diffraction and friction coefficient, it was confirmed that the crystalline structure of the graphite obtained by the method of the present invention is preserved, and that the physical properties of this graphite are unchanged during the pulverizing process.

The significance and applicability of the present invention will be further apparent from the following analysis. The present inventors, for practical analysis, consider that two kinds of mechanisms of pulverizing graphite are involved. The graphite crystal has hexagonal and laminar structure. Since the binding forces between the basal planes are weak, the graphite is ready to be pulverized into flaky-shaped particles by laminar cleavage. Furthermore, since the graphite has such a crystalline structure, it has lubricating property to a high degree, which causes fine pulverizing to be difficult. In contrast, since the graphite particles produced by the pulverizing method of the present invention are nearly spherical in shape and have rough surfaces, this pulverizing is not of the cleavage type. In the mechanism of pulverizing by conventional methods, the adsorbed water vapor and gases act as lubricants and cause shearing force to act parallel to the cleavage planes, whereby pulverizing of the cleavage type takes place. In contrast, the mechanism of pulverizing according to the present invention is that of pulverizing of the impact type. That is, in the conventional pulverizing, the pulverizing results from the cleavage along the cleavage planes, and pulverizing of the cleavage type takes place because the adsorbed film of such substances as water vapor and oxygen gas adsorbed on the crystal surfaces acts as a lubricating oil and causes shearing force to act parallel to the cleavage planes of the graphite crystals. In contrast, in the case of pulverizing in a vacuum, in dry nitrogen gas, or in dry inert gases, the aforesaid adsorbed film on the surfaces of the graphite will become less than monomolecular in thickness. Accordingly, impact force is applied on the graphite cleavage planes in random directions, whereby, rather than pulverizing of the cleavage type, pulverizing of the ordinary impact type takes place.

Since the above-described two kinds of pulverizing mechanisms are completely different, the pulverizing efficiencies due to these two types of pulverizing are considerably different, and the shapes of the graphite produced by these two types of pulverizing are also different.

As may be understood from the foregoing description, by the practice of the method according to the present invention, graphite particles particle sizes of which are adjustable at will by suitably selecting the particle size of the raw graphite and the pulverizing time can be produced in a simple manner, by means of relatively simple and low-cost apparatus, with high pulverizing efficiency and high yield.

Since it is obvious that many changes and modifications can be made in the above described details without departing from the nature and spirit of the invention, it is to be understood that the invention is not to be limited to the details described herein except as set forth in the appended claims.

What is claimed is:

1. A process of manufacturing fine graphite particles which comprises:

placing coarse graphite particles in an air-tight impact pulverizing rotatable vessel;

removing water vapor and oxygen from within the confines of said vessel until the qauntity of water vapor and oxygen adsorbed on the surfaces of said particles becomes less than a monomolecular layer;

thereafter rotating said vessel, thereby comminuting said coarse graphite particles;

continuing said comminuting until said coarse particles have been impact pulverized to fine graphite particles of a predetermined size; and recovering said fine graphite particles from said vessel.

2. The process of claim 1 wherein pulverization is carried out in a vacuum atmosphere.

3. The process of claim 1 wherein pulverization is carried out in a nitrogen gas atmosphere.

4. The process of claim 1 wherein pulverization is carried out in an inert gas atmosphere.

5. The process of claim 1 wherein pulverization is carried out in a hydrogen gas atmosphere.

6. The process of claim 1 wherein pulverization is carried out in a carbon dioxide gas atmosphere.

7. The process of claim 1 wherein pulverization is carried out in a dry oxygen gas atmosphere under reduced pressure.

References Cited in the file of this patent

UNITED STATES PATENTS

| | | |
|---|---|---|
| 920,857 | Frank | May 4, 1909 |
| 1,575,717 | Plauson | Mar. 9, 1926 |
| 2,112,497 | Kramer | Mar. 29, 1938 |
| 2,626,930 | Savage | Jan. 27, 1953 |
| 3,011,960 | Williams et al. | Dec. 5, 1961 |